Patented June 16, 1931

1,810,880

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

ROOFING AND WEATHERPROOFING MATERIAL

No Drawing. Original application filed September 6, 1921, Serial No. 498,861. Divided and this application filed September 10, 1927. Serial No. 218,863.

The object of this invention is to provide an improved method of causing sheets, pieces or objects of felt waterproofing material, or other fabrics or materials for other purposes, to adhere one to the other, or to surfaces suitably prepared to receive them, by the mere act of bringing together the surfaces desired to be adhered; also to provide suitable substances for use in preparing the surfaces for adhesion or for introduction between the surfaces so that they will be caused to adhere in accordance with such method; also to produce such sheets, pieces, or other objects of fabric, in form suitable for various commercial purposes, with such substances applied to them in a manner that will cause them to adhere when assembled or applied in the manner for which they are intended.

The invention proceeds upon the principle of applying to a surface or surfaces which are to be adhered, or introducing between two such surfaces a substance which will react upon the material or surfacing, opposed to it, and draw from the latter an element or ingredient that will convert the applied substance into a condition which will cause it to serve as an adhesive. For example, upon the surface of material which is to be adhered, or between such surface and that of another surface to which it is to be united, is placed a jelly-like substance of an absorptive nature which will act upon asphaltic, bituminous or other like surfacing, or impregnating materials in waterproof fabric, and cause transfusion of an ingredient of such material into the jelley-like substance thereby converting the latter into the desired adhesive and causing it to unite the surfaces that are brought together. Waterproofing substance which is carried by one member of the union, is preferably caused to act upon the jelly-like substance with the effect of stiffening and toughening contacting surfaces, thus causing adhesion and finally binding together, and in order that the jelly-like substances will be adapted to induce this transfusion, it has incorporated in it a solvent which slowly dissolves the bituminous or other ingredient of the surfacing or impregnating material and reduces it to a condition in which it will be absorbed by the jelly-like substance. However, it is not the intention to limit the scope of this invention to transfusion, but two like substances may be placed in contact, as, for instance, two jelly-like substances, one containing the solvent, the other being a jelly-like substance containing in its composition bituminous or other material which does not contain the solvent but which may impart to the jelly-like substance with which it comes in contact some of its body structure by reason of the solvent carrying jelly-like substances.

For convenience, it is well to divide these substances into various groups.

Group "A" represents that class of jelly-like substances which constitutes a metal soap which has a jelly-like nature but still retains the adhesive qualities. This may be termed the base of the jelly-like substances in question. Such base may be prepared by saponifying certain oils and after the oils are saponified, precipitated in a solution containing a metal salt, then washing the jelly-like substances to eliminate all surplus precipitate and chemicals to neutralize the soap. One way of producing this jelly-like substance would be to mix castor oil and caustic soda and add thereto aluminum sulphate as a metal salt.

Group "B" will be considered as consisting of metal soaps obtained as described with reference to group "A" and treated with turpentine or other like volatile substances having solvent powers, which solvent is taken up by the jelly-like substance and helps to set it more firmly and give to it a more transparent body.

Group "C" consists of such metal soaps as derived according to the method explained with reference to group "A" and which have been treated with solvents, such as turpentine, as indicated in "B", but which have had added to them such substances as silicate of soda, resin, solvent oils, or the like, which gives them more of an adhesive body but which still retains the jelly-like nature.

Group "D" consists of one of the metallic bases which has added to it solvent oils such as resin, fusel oil and the like, and resin and an oil treated with one of the metal chlorides, such as zinc chloride, which imparts a more stringy nature and make the jelly-like substances very flexible and rubbery.

Group "E" consists of a metal soap base in which the solvent oils have been omitted, but which are compounded with a bituminous or other body substance, such as 240° melt point blown asphalt in a plastic state, which does not destroy the jelly-like consistency of the soap but imparts a firmer body yet retains its jelly-like nature.

Group "F" consists of a metal soap base of a jelly-like nature yet adhesive and stringy, which has had added to it a fat, such as tallow, resin, a solvent, such as fusel oil, and wood flour.

Group "G" consists of group "C" incorporated in a treated oil, fat, gum or wax, giving firmness to the body and stopping the tendency to flow. Beeswax may be used for the gum or wax in this group.

The following formula will produce the metal soap base: It consists of castor oil treated with approximately fifteen per cent by weight of caustic soda, and then precipitated in a mixture of heated water, plus a metal chloride. The degree of the jelly-like nature may be regulated by the length of heating and by the varying amounts of caustic soda or other suitable alkali. Further treatment of this jelly-like substance is noted in the various group forms, all of which embodiments give various results and consistencies.

The present invention is a division of my co-pending application Serial No. 498,861, filed September 6, 1921.

I claim:

1. A building material comprising a vehicle carrying a normally non-adhesive substance of jelly-like consistency and adapted to be rendered adhesive by contact with a bituminous waterproofing material.

2. A constructional material comprising a foundation coated with a substance of jelly-like consistency, normally non-adhesive, said substance containing metal soap and an oil which is a solvent of bituminous waterproofing material, said jelly-like substance being adapted to become adhesive under the action of the dissolved waterproofing material.

3. A vehicle carrying a normally jelly-like substance including a metal soap and a solvent oil, adapted to impart to the jelly-like substance the capability of rendering bituminous waterproofing material solvent.

4. A constructional material comprising a base and a coating comprising a normally non-adhesive, jelly-like substance containing a solvent for bituminous waterproofing material, said jelly-like substance adapted to absorb an ingredient of said material and thereby becoming adhesive.

5. A vehicle carrying a normally jelly-like substance containing a solvent for an ingredient of bituminous waterproofing material, said jelly-like substance adapted to become adhesive under the action of such ingredient when rendered solvent.

6. A vehicle carrying a normally jelly-like substance including a metal soap and a solvent for an ingredient of a bituminous waterproofing material, said substance adapted to become adhesive under the action of said ingredient when thus rendered solvent.

Signed at Chicago, Illinois, this 8th day of September, 1927.

ALBERT C. FISCHER.